United States Patent [19]

Morris

[11] 3,992,853
[45] Nov. 23, 1976

[54] SPRING CLIP
[76] Inventor: Max O. Morris, 582 E. Sunset Highway, Issaquah, Wash. 98027
[22] Filed: June 9, 1975
[21] Appl. No.: 585,451

[52] U.S. Cl. .......................... 52/760; 24/230.5 TP; 5/259 B
[51] Int. Cl.² ......................................... F16B 7/04
[58] Field of Search ................ 52/760; 24/230.5 TP, 24/73 SS, 73 HH; 5/259 R, 259 B

[56] References Cited
UNITED STATES PATENTS

| | | | |
|---|---|---|---|
| 2,328,757 | 7/1943 | Tinnerman ........................ | 52/760 X |
| 2,716,442 | 8/1955 | Larson et al. ...................... | 5/259 X |
| 2,976,823 | 3/1961 | Dodge ................................. | 52/760 X |
| 3,671,031 | 6/1972 | Krakauer .......................... | 5/259 R X |
| 3,791,749 | 2/1974 | Grille et al. ........................ | 52/760 |
| 3,879,812 | 4/1975 | Clinch ............................... | 24/230.5 TP |

Primary Examiner—Wayne L. Shedd
Attorney, Agent, or Firm—Bell, Seltzer, Park & Gibson

[57] ABSTRACT

A spring clip for being secured to framework rails of an item of furniture and the like for receiving and holding opposite end portions of conventional, zig-zag, spring strips suspended between the rails and being characterized by a self-locking construction, as follows. A fastening portion defines a generally elongate surface for being secured to the rail. A spring receiving portion is of flexible, resilient material and a generally C-shaped, cross-sectional configuration defining an interior opening therein and a passageway therethrough for insertion of the end portion of the spring strip. The passageway is of a normally less cross-sectional dimension than the spring strip end portion for flexible expansion of the spring receiving portion enlarging the passageway during insertion of the spring strip end portion therethrough and for resilient contraction returning the passageway to its normal cross-sectional dimension after receipt of the spring strip end portion in the interior opening for locking of the spring strip therein.

10 Claims, 6 Drawing Figures

U.S. Patent  Nov. 23, 1976  3,992,853
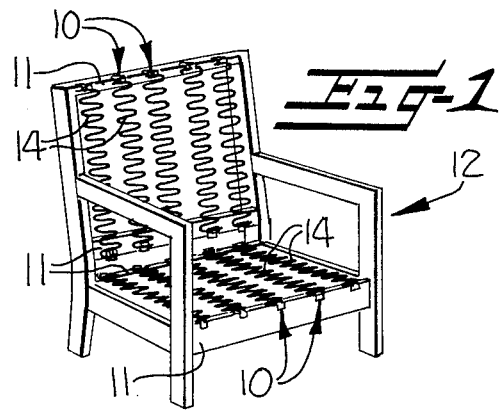
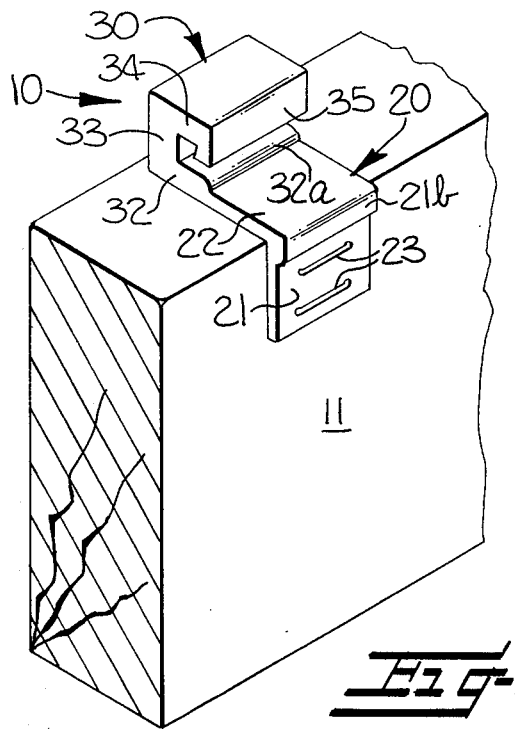
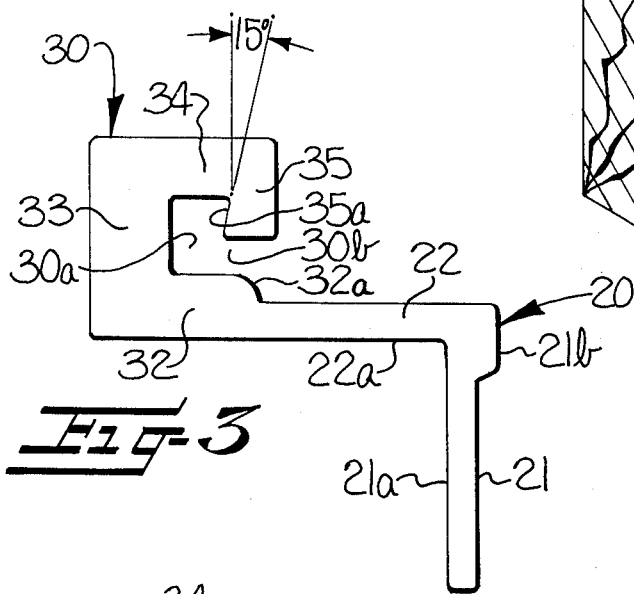
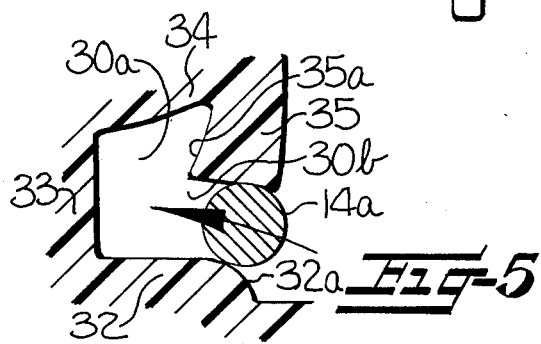
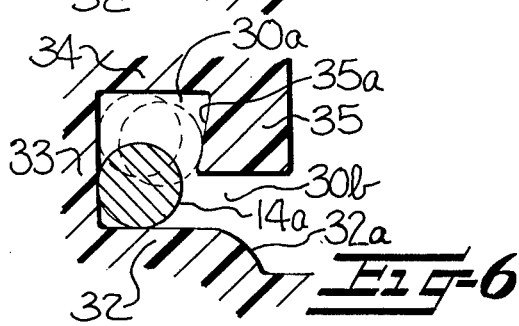
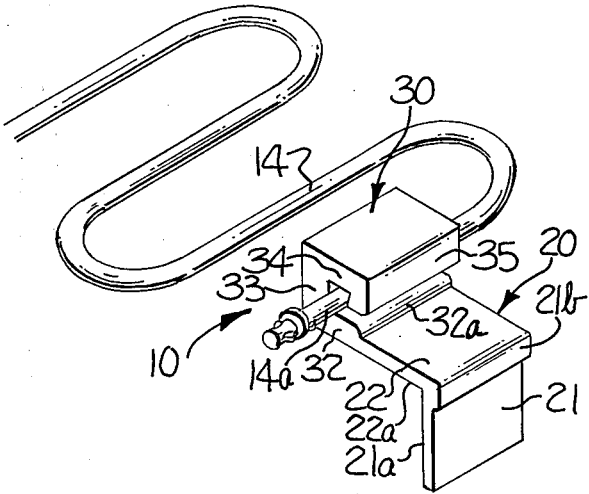

SPRING CLIP

This invention relates to a spring clip for being secured to framework rails of an item of furniture and the like for receiving and holding opposite end portions of conventional, zig-zag, spring strips suspended between the rails and is characterized by a self-locking construction.

BACKGROUND OF THE INVENTION

There is a need, particularly in the field of furniture construction, for devices with which springs may be suspended between open framework rails of a piece of furniture and the like. For the most part, these springs are in the form of zig-zag, spring strips which are usually sinuous and prearched. However, other types of zig-zag or sinuous spring strips, such as those with nearly square rather than sharp corners or with irregular bends are also utilized and sometimes coil springs are utilized. All of these types of springs are stretched or suspended between spaced, framework rails forming the item of furniture and include generally straight opposite end portions which must be secured to the rails forming the framework of the item of furniture being built.

For the most part, "spring clips" as they are referred to in the industry have been utilized for securing these end bar portions of zig-zag spring strips to the framework rails of the item of furniture being built. Conventionally, these spring clips were of generally J-shaped construction in which the long leg of the spring clip was secured to the framework rail of the furniture and the looped portion of the spring clip receive the end bar portion of the spring strips and were bent down or otherwise locked to hold the end bar portion in position in the spring clip after installation therein. The spring clips were often constructed of metal or other bendable material which would lock the end bar portion of the spring strip into place after it had been inserted therein and the spring clip bent down thereover. Also, it was often necessary to hold these prior spring clips into a locked position by the insertion of a fastener therein to hold the spring clip in its bent position with the end portion of the spring strip therein.

Use of such prior conventional spring clips resulted in numerous problems in the industry, such as the inability to release the spring strips from the spring clips after they were installed therein, the expensive and complicated design of the spring clips, the necessity for high quality lumber for the framework rails, malfunctioning or breaking of the spring clips, etc.

Although some prior attempts have been made to overcome some of the above problems with conventional spring clips, these attempts for the most part have been unsuccessful in providing an inexpensive, uncomplicated, commercially acceptable design of a spring clip for use in the furniture or other industries. Examples of such prior attempts to improve the construction of spring clips are disclosed in the following patents considered in connection with the present invention:

| Patent No. | Inventor | Date of Issue |
| --- | --- | --- |
| 3,199,163 | Surletta | August 10, 1965 |
| 3,422,468 | Schutz | January 21, 1969 |
| 3,671,031 | Krakauer | June 20, 1972 |

-continued

| Patent No. | Inventor | Date of Issue |
| --- | --- | --- |
| 3,720,960 | Bond | March 20, 1973 |
| 3,791,749 | Grille et al | February 12, 1974 |

OBJECTS AND SUMMARY OF THE INVENTION

Accordingly, it is the object of this invention to provide an improved construction of a spring clip for being secured to opposing rails of an item of furniture and the like for receiving and holding opposite end portions of conventional, zig-zag, spring strips.

It is a further more specific object of this invention to provide such an improved spring clip which is characterized by a self-locking construction.

It is a further object of this invention to provide such a spring clip which may be easily and inexpensively manufactured.

It has been found that the above objects may be accomplished by providing a spring clip, including broadly the following:

A fastener portion defines a generally elongate surface for resting against and being secured to the framework rail of the item of furniture or the like. A spring receiving portion is secured to the fastening portion and comprises flexible, resilient material and a generally C-shaped, cross-sectional configuration defining an interior opening for receiving the end portion of the spring strip therewithin and a passageway therethrough for insertion of the end portion of the spring strip into the interior opening. The passageway is of a normally less cross-sectional dimension than the cross-sectional dimension of the end portion of the spring strip for flexible expansion of the spring receiving portion enlarging the passageway during insertion of the end portion of the spring strip therethrough and for resilient contraction of the spring receiving portion returning the passageway to its normal cross-sectional dimension after receipt of the end portion of the spring strip in the interior opening for self-locking of the end portion of the spring strip therein.

Preferably, the spring clip of this invention comprises an integral, one-piece, resilient and flexible plastic construction for inexpensive mass production.

Other specifics of the spring clip of this invention may be seen from the following, more detailed description of a preferred embodiment.

BRIEF DESCRIPTION OF THE DRAWINGS

Some of the objects and advantages of this invention having been set forth, other objects and advantages will appear from the following more detailed description, when taken in conjunction with the accompanying drawings, in which:

FIG. 1 is a perspective view of an item of furniture utilizing the improved spring clip construction of this invention for holding opposite end portions of spring strips;

FIG. 2 is an enlarged perspective view showing a portion of a framework rail of an item of furniture and the like having the spring clip of this invention secured thereto for receiving the end portion of a spring strip;

FIG. 3 is a side, elevational view of the spring clip of this invention;

FIG. 4 is a perspective view of the spring clip of this invention and illustrating the end portion of a spring strip received and held therein;

FIG. 5 is a partial, cross-sectional view of the spring clip of this invention illustrating the end portion of the spring strip being inserted therein; and FIG. 6 is a view, like FIG. 5, illustrating the end portion of the spring strip after it has been inserted into the spring clip.

DESCRIPTION OF THE PREFERRED EMBODIMENT

Referring now to the drawings, the spring clip, generally indicated at 10, of this invention is illustrated in FIG. 1 as being attached to spaced, generally parallel, framework rails 11 constituting part of the frame of an item of furniture 12, such as a chair, for receiving and holding opposite end portions 14a of conventional, zig-zag, spring strips 14 suspended between the rails 11. While the preferred use for the spring clip 10 of this invention is illustrated as being utilized with framework rails 11 of an item of furniture 12, it is to be understood that this spring clip 10 could be used with other items of furniture and other items of manufacture which have framework rails between which it is desired to suspend a spring strip.

The spring clip 10 preferably comprises an integral, one-piece, resilient and flexible plastic construction and it has been found that styrene is a suitable plastic for use in molding or otherwise forming the spring clip 10 for inexpensive mass production and for providing the strength, flexibility and resiliency desired.

The spring clip 10 includes a fastening portion, generally indicated at 20 for resting against and being secured to the rail 11 (see FIG. 2). For this purpose, the fastening portion 20 preferably comprises angularly related, elongate, integrally connected, first and second leg members 21, 22 disposed generally perpendicular with respect to each other and each defining an inside, generally flat surface 21a, 22a for being positioned against angularly related outside surfaces of a corner of the rail 11 which is normally of generally rectangular, cross-sectional configuration. The fastening portion 20 may be easily secured to the rail 11 by the use of fasteners 23 (FIG. 2) which may be in the form of staples, nails, screws, etc. inserted through one or both of the leg members 21, 22 and into the rail 11.

Preferably, at least one of the first and second leg members 21, 22 of the fastening portion 20 of the spring clip 10 includes an increased thickness portion 21b at the juncture thereof with the other of the leg members for providing additional strength to the fastening portion for absorbing shocks during use of the spring clip 10 and the item of furniture 12.

The spring clip 10 further includes a spring receiving portion 30 secured to and integrally extending from the fastening portion 20 and the leg 22 thereof. The spring receiving portion 30 is of a generally C-shaped cross-sectional configuration defining an interior opening 30a for receiving the end portion 14a of the spring strip 14 therewithin and a passageway 30b therethrough for insertion of the end portion 14a of the spring strip into the interior opening 30a.

Preferably, the spring receiving portion is of a generally block C-shaped configuration including a first longitudinally extending leg member 32 integrally extending at one end thereof from one end of the leg 22 of the fastening portion 20 and being of an increased thickness with respect to the leg 22 of the fastening portion 20 for defining an inwardly extending, arcuate, leading, camming surface 32a into the passageway 30b through the spring receiving portion 30 for aiding insertion of the end portion 14a of the spring strip 14 into the interior opening 30a of the spring receiving portion 30.

The spring receiving portion 30 further includes a second transversely extending leg member 33 integrally extending at one end from the other end of the first leg member 32 and being disposed generally perpendicular to the first leg member 32. There is further provided a third longitudinally extending leg member 34 integrally extending at one end from the other end of the second leg member 33 and disposed generally parallel with the first leg member 32. A fourth transversely extending leg member 35 integrally extends at one end from the other end of the third leg member 34 and is disposed generally perpendicular to the first leg member 32.

The other end of the fourth leg member 35 terminates short of the first leg member 32 and generally over the leading camming surface 32a thereon to restrict the passageway 30b through the spring receiving portion 30 to a normally less cross-sectional dimension than the cross-sectional dimension of the end portion 14a of the spring strip 14.

Thus, as the end portion 14a of the spring strip 14 is forced through the passageway 30b (FIG. 5), the spring receiving portion 30 will expand due to the flexible and resilient material from which it is constructed to enlarge the passageway 30b. The camming surface 32a will aid in moving the end portion 14a through the passageway 30b and causing such flexible expansion of the spring receiving portion 30 and the passageway 30b. After the end portion 14a of the spring strip 14 has passed through the passageway 30b and is received within the interior opening 30a of the spring receiving portion 30, the spring receiving portion 30 will resiliently contract also due to the resilient and flexible material from which it is made returning the passageway 30b to its normal cross-sectional dimension (FIG. 6) for locking of the end portion 14a of the spring strip 14 within the interior opening 13a of the spring receiving portion 30.

Preferably, all of the legs 32, 33, 34, 35 of the spring receiving portion 30 include generally flat interior surfaces which define the interior opening 30a of a larger cross-sectional dimension than the end portion 14a of the spring strip 14. These flat surfaces extend generally parallel with the direction of extension of the respective legs with the exception of interior surface 35a of the fourth leg 35; wherein, it has been found preferred that this inside surface 35a be disposed at an inwardly extending, acute, included angle with respect to an axis perpendicular to the first leg member 32 for providing a camming surface for camming the end portion 14a of the spring strip 14 received in the interior opening 30a away from the passageway 30b during movement of the spring strip 14 which would occur during use of the item of furniture 12. This camming action is indicated generally by the solid line and dotted line positions of the end portion 14a of the spring strip 14 in FIG. 6. It has been found that this inside surface 35a of the fourth leg 35 of the spring receiving portion 30 will accomplish this purpose if it is disposed at a generally 15° angle with respect to an axis perpendicular to the first leg member 32, as shown in FIG. 3.

Thus, it may be seen that this invention has provided an improved construction of a spring clip for being secured to opposing rails of an item of furniture and the like for receiving and holding opposite end portions of conventional, zig-zag, spring strips and which is characterized by a self-locking construction eliminating the necessity for manual bending or otherwise locking of the spring strip in position in the spring clip and which is preferably of a plastic construction for easy and inexpensive mass production.

In the drawings and specification, there has been set forth a preferred embodiment of this invention, and although specific terms are employed they are used in a generic and descriptive sense only and not for purposes of limitation.

What is claimed is:

1. A spring clip for being secured to framework rails of an item of furniture and the like for receiving and holding opposite end portions of conventional, zig-zag, spring strips suspended between the rails and being characterized by a self-locking and self-releasing construction; said spring clip comprising:

a fastening portion defining a generally elongate surface for resting against and being secured to the rail; and a spring receiving portion secured to said fastening portion and comprising flexible, resilient material and a generally C-shaped, cross-sectional configuration defining an interior opening therein and a passageway therethrough for insertion and removal of the end portion of the spring strip therethrough and into said interior opening, said passageway being of a normally less cross-sectional dimension than the cross-sectional dimension of the end portion of the spring strip for flexible expansion of said spring receiving portion enlarging said passageway during insertion and removal of the end portion of the spring strip therethrough and for resilient contraction of said spring receiving portion returning said passageway to its normal cross-sectional dimension after receipt of the end portion of the spring strip in said interior opening for locking of the end portion of the spring strip therein.

2. A spring clip, as set forth in claim 1, in which said fastening portion of said spring clip comprises angularly related, elongate, connected, first and second leg members disposed generally perpendicular with respect to each other and each defining an inside, generally flat surface for being positioned against angularly related outside surfaces of a corner of a rail of generally rectangular cross-sectional configuration.

3. A spring clip, as set forth in claim 2, in which at least one of said first and second leg members of said fastening portion of said spring clip includes an increased thickness area at the juncture thereof with the other of said leg members for additional strength to absorb shocks during use of said spring clip.

4. A spring clip, as set forth in claim 1, in which said spring receiving portion comprises a generally block C-shaped configuration including a first longitudinally extending leg member secured at one end thereof to said fastening portion, a second transversely extending leg member secured at one end to the other end of said first leg member and disposed generally perpendicular to said first leg member, a third longitudinally extending leg member secured at one end to the other end of said second leg member and disposed generally parallel with said first leg member, and a fourth transversely extending leg member secured at one end to the other end of said third leg member and disposed generally perpendicular to said first leg member, the other end of said fourth leg member terminating short of said first leg member to form said passageway through said spring receiving portion for insertion of the end portion of the spring strip into said interior opening of said spring receiving portion.

5. A spring clip, as set forth in claim 4, in which said fourth leg member of said spring receiving portion includes a generally flat inside surface disposed at an inwardly extending, acute, included angle with respect to an axis perpendicular to said first leg member for camming the end portion of the spring strip received in said interior opening away from said passageway during movement of said spring strip.

6. A spring clip, as set forth in claim 4, in which said first leg member of said spring receiving portion comprises an increased thickness with respect to said fastening portion for defining an inwardly extending, arcuate, leading, camming surface into said passageway through said spring receiving portion for aiding insertion of the end portion of the spring strip into said interior opening of said spring receiving portion of said spring clip.

7. A spring clip for being secured to framework rails of an item of furniture and the like for receiving and holding opposite end portions of conventional, zig-zag, spring strips suspended between the rails and being characterized by a self-locking and self-releasing construction; said spring clip comprising an integral, one-piece, resilient and flexible plastic construction including:

a fastening portion defining a generally elongate surface for resting against and being easily secured to the rail by fasteners and the like inserted therethrough and into the rail; and a spring receiving portion integrally extending from one end of said fastening portion and comprising a generally C-shaped cross-sectional configuration defining an interior opening therein and a passageway therethrough for insertion and removal of the end portion of the spring strip therethrough and into said interior opening, said passageway being of a normally less cross-sectional dimension than the cross-sectional dimension of the end portion of the spring strip for flexible expansion of said spring receiving portion enlarging said passageway during insertion and removal of the end portion of the spring strip therethrough and for resilient contraction of said spring receiving portion returning said passageway to its normal cross-sectional dimension after receipt of the end portion of the spring strip in said interior opening for locking of the end portion of the spring strip therein.

8. A spring clip, as set forth in claim 7, in which said fastening portion of said spring clip comprises angularly related, elongate, integrally connected, first and second leg members disposed generally perpendicular with respect to each other and each defining an inside, generally flat surface for being positioned against angularly related outside surfaces of a corner of a rail of generally rectangular cross-sectional configuration, at least one of said first and second leg members including an increased thickness area at the juncture thereof with the other of said leg members for providing additional strength to absorb shocks during use of said spring clip.

9. A spring clip, as set forth in claim 7, in which said spring receiving portion comprises a generally block C-shaped configuration including a first longitudinally extending leg member integrally extending at one end thereof from said fastening portion and being of an increased thickness with respect to said fastening portion for defining an inwardly extending, arcuate, leading, camming surface into said passageway through said spring receiving portion for aiding insertion of the end portion of the spring strip into said interior opening of said spring receiving portion, a second transversely extending leg member integrally extending at one end from the other end of said first leg member and disposed generally perpendicular to said first leg member, a third longitudinally extending leg member integrally extending at one end from the other end of said second leg member and disposed generally parallel with said first leg member, and a fourth transversely extending leg member integrally extending at one end from the other end of said third leg member and disposed generally perpendicular to said first leg member, the other end of said fourth leg member terminating short of said first leg member and generally over said leading camming surface thereon to define said passageway through said spring receiving portion for insertion of the end portion of the spring strip into said interior opening of said spring receiving portion, said fourth leg member including a generally flat inside surface disposed at an inwardly extending, acute, included angle with respect to an axis perpendicular to said first leg member for camming the end portion of the spring strip receiving in said interior opening away from said passageway during movement of said spring strip.

10. A spring clip for being secured to framework rails of an item of furniture and the like for receiving and holding opposite end portions of conventional, zig-zag, spring strips suspended between the rails and being characterized by a self-locking construction; said spring clip comprising an integral, one-piece, resilient and flexible plastic construction including:

a fastening portion comprising angularly related, elongate, integrally connected, first and second leg members disposed generally perpendicular with respect to each other and each defining an inside, generally flat surface for being positioned against angularly related outside surfaces of a corner of a rail of generally rectangular cross-sectional configuration and for being easily secured thereto by fasteners and the like inserted through at least one of said legs and into the rail, at least one of said first and second leg members including an increased thickness area at the juncture thereof with the other of said leg members for providing additional strength to absorb shocks during use of the spring clip; and a spring receiving portion comprising a generally block C-shaped configuration defining an interior opening therein and a passageway therethrough for insertion of the end portion of the spring strip therethrough and into said interior opening and including a first longitudinally extending leg member integrally extending at one end thereof from one end of one of said legs of said fastening portion and being of an increased thickness with respect to said leg of said fastening portion for defining an inwardly extending, arcuate, leading, camming surface into said passageway for aiding the insertion of the end portion of the spring strip into said interior opening, a second transversely extending leg member integrally extending at one end from the other end of said first leg member and disposed generally perpendicular to said first leg member, a third longitudinally extending leg member integrally extending at one end from the other end of said second leg member and disposed generally parallel with said first leg member, and a fourth transversely extending leg member integrally extending at one end from the other end of said third leg member and disposed generally perpendicular to said first leg member, the other end of said fourth leg member terminating short of said first leg member and generally over said leading camming surface thereon to restrict said passageway to a normally less cross-sectional dimension than the cross-sectional dimension of the end portion of the spring strip for flexible expansion of said spring receiving portion enlarging said passageway during insertion of the end portion of the spring strip therethrough and for resilient contraction of said spring receiving portion returning said passageway to its normal cross-sectional dimension after receipt of the end portion of the spring strip in said interior opening for locking of the end portion of the spring strip therein, said fourth leg member including a generally flat inside surface disposed at an inwardly extending, acute, included angle with respect to an axis perpendicular to said first leg member for camming the end portion of the spring strip received in said interior opening away from said passageway during movement of said spring strip.

* * * * *

UNITED STATES PATENT OFFICE
CERTIFICATE OF CORRECTION

PATENT NO. : 3,992,853
DATED : November 23, 1976
INVENTOR(S) : Max O. Morris

It is certified that error appears in the above-identified patent and that said Letters Patent are hereby corrected as shown below:

Column 7, line 35, "receiving" should be --received--.

Signed and Sealed this

Twenty-second Day of February 1977

[SEAL]

Attest:

RUTH C. MASON
Attesting Officer

C. MARSHALL DANN
Commissioner of Patents and Trademarks